United States Patent
Salowey

(10) Patent No.: US 8,160,638 B2
(45) Date of Patent: Apr. 17, 2012

(54) CONTROLLING MULTI-MODE DEVICES

(75) Inventor: Joseph Salowey, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 852 days.

(21) Appl. No.: 12/103,445

(22) Filed: Apr. 15, 2008

(65) Prior Publication Data

US 2009/0258649 A1 Oct. 15, 2009

(51) Int. Cl.
H04M 1/00 (2006.01)
H04W 4/02 (2009.01)
H04W 36/14 (2009.01)
H04W 36/32 (2009.01)

(52) U.S. Cl. .......... 455/552.1; 455/435.2; 455/440; 455/456.1; 370/311; 370/331

(58) Field of Classification Search .......... 455/552.1, 455/439–440, 456.1
See application file for complete search history.

(56) References Cited

U.S. PATENT DOCUMENTS

| 6,061,337 | A  | * | 5/2000  | Light et al. ................. 455/440 |
| 7,260,399 | B1 | * | 8/2007  | Oh et al. .................... 455/552.1 |
| 7,289,810 | B2 |   | 10/2007 | Jagadeesan et al. |
| 7,519,026 | B1 | * | 4/2009  | Oh ............................. 455/440 |
| 2004/0023669 | A1 | * | 2/2004 | Reddy ........................ 455/456.1 |
| 2005/0073977 | A1 | * | 4/2005 | Vanghi et al. ............... 370/335 |
| 2005/0208966 | A1 | * | 9/2005 | David et al. ................ 455/553.1 |
| 2005/0221824 | A1 | * | 10/2005 | Lee et al. ................... 455/435.2 |
| 2005/0239498 | A1 | * | 10/2005 | Dorenbosch et al. ...... 455/552.1 |
| 2007/0232282 | A1 | * | 10/2007 | Barbaresi et al. .......... 455/414.3 |
| 2007/0260710 | A1 | * | 11/2007 | Dowling ..................... 709/219 |
| 2008/0102787 | A1 | * | 5/2008 | Landschaft et al. ....... 455/404.2 |
| 2008/0130597 | A1 | * | 6/2008 | Kalhan ....................... 370/338 |
| 2009/0168676 | A1 | * | 7/2009 | Olson ......................... 455/552.1 |
| 2010/0103829 | A1 | * | 4/2010 | Murzeau et al. ............ 370/252 |

* cited by examiner

Primary Examiner — Nick Corsaro
Assistant Examiner — Tangela T. Chambers
(74) Attorney, Agent, or Firm — Tucker Eillis LLP

(57) ABSTRACT

In an example embodiment, a technique for automatically controlling radio interfaces of a multi-mode device. Wireless interfaces are enabled or disabled based on the probability of network availability of the interfaces at a current geographical location.

15 Claims, 2 Drawing Sheets

CONTROLLING MULTI-MODE DEVICES

TECHNICAL FIELD

The present disclosure relates generally to devices with multiple wireless interfaces.

BACKGROUND

Multi-mode devices have multiple radio interfaces. For example, a device may have both a cellular and a WiFi interface. The device may periodically poll each network to determine availability. If the device is in an area where there is no coverage for a particular radio technology, polling or attempting to connect to the network corresponding to the particular radio technology wastes battery power.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
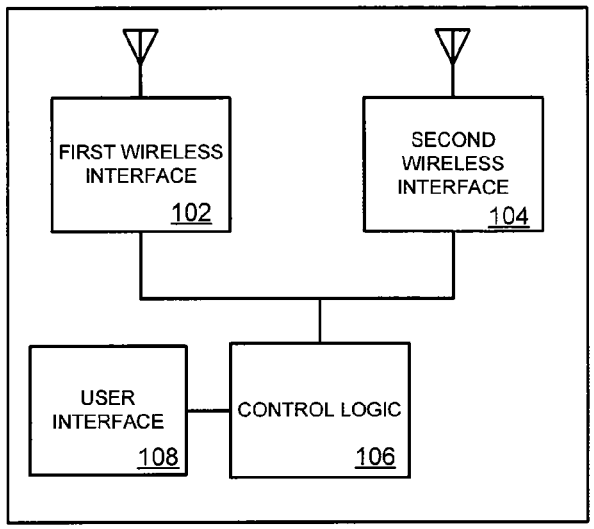
FIG. 1 is a block diagram illustrating an example multi-mode device.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Disclosed in an example embodiment herein is a technique for automatically controlling radio interfaces of a multi-mode device. Wireless interfaces are enabled or disabled based on the probability of network availability of the interfaces at a current geographical location.

In accordance with an example embodiment, there is disclosed herein an apparatus comprising a communication interface configured to receive location data for a wireless multi-mode device having a first wireless interface and a second wireless interface. The apparatus further comprises logic in communication with the communication interface and configured to send and receive data via the communication interface. The logic is configured to continuously receive data representative of a location of the wireless multi-mode device via the communication interface. The logic is configured to determine whether the wireless multi-mode device is able to connect to a network using the second wireless interface based on the data representative of a location. The logic is configured to send a signal via the communication interface to the wireless multi-mode device to enable the second wireless interface responsive to determining the second wireless interface is able to connect to a network.

In accordance with an example embodiment, there is disclosed herein a method comprising establishing communication with a wireless multi-mode device having a first wireless interface and a second wireless interface via the first wireless interface. The location of the wireless multi-mode device is continuously determined. The probability of whether the second wireless interface will be able to connect to a network based is determined based on the location of the multi-mode device. The second wireless interface may be using the same protocol as the first wireless interface, or the second wireless interface may be using a different protocol than the first wireless interface. Control information is sent to the wireless multi-mode device via the first wireless interface to inform the wireless multi-mode device to use the second wireless interface for communication.

In accordance with an example embodiment, there is disclosed herein an apparatus comprising a first wireless interface configured to communicate using a first protocol, a second wireless interface configured to communicate using a second protocol, and logic coupled to the first wireless interface and the second wireless interface operative to control the operation of the first wireless interface and the second wireless interface. The logic is operable to determine coordinates for a current location. The logic is further operable to send a signal via the first interface containing data representative of the coordinates for the current location. The logic is operable to connect to a network via the second interface responsive to receiving a signal on the first wireless interface comprising data indicating a network connection is available on the second wireless interface.

In accordance with an example embodiment, there is disclosed herein a method comprising establishing communication with a network via a first wireless communication interface and establishing communication with a second network via a second wireless communication interface. A signal is received on one of a group consisting of the first wireless interface and the second wireless interface to discontinue using the second wireless communication interface. Use of the second wireless interface is discontinued responsive to the signal. Data is received via an associated user interface to switch on the second wireless interface after use of the second wireless interface was discontinued. The second wireless interface is activated responsive to the data received via the associated user interface.

Description of Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described in connection with the embodiment is included in at least one embodiment described herein. The appearances of the phrase "in one embodiment" or "in one or more embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

In an example embodiment, described herein is a multi-mode device that has multiple wireless (e.g. radio) interfaces corresponding to multiple network infrastructures. The multiple radio devices acquire network services from the corresponding network infrastructures. In particular embodiments, a central authority communicates with the multi-mode device for controlling the multi-mode device's radio interface.

In operation, the multi-mode device is connected to a network infrastructure over a particular interface. The location of the multi-mode device is determined. The location may be determined by the multi-mode device or by the network infrastructure using any suitable technique such as GPS (Global Positioning System), TDOA (Time difference of arrival) or triangulation. The location is communicated to a device on the network infrastructure (referred to herein as a "central authority") that calculates the probability of availability of various types of interfaces at the location of the multi-mode device. The central authority communicates control information to the multi-mode device that enables the interfaces that are likely to work and disable the interfaces that are not likely to work.

In an example embodiment, a user of the multi-mode device may be able to override the central control. For example, even though the user is in a remote area the user may enable WiFi because the user is at a WiFi hotspot such as a gas station or restaurant.

In an example embodiment, the central authority may be accessible on a particular network interface with wide area coverage such as a cellular network. In another example embodiment, the central authority is available through several network interfaces and infrastructures, such as being located on the Internet. The central authority may calculate probability based on configured information such as population density, geo-political information, and known hot spot locations. In an example embodiment, control information may also control other characteristics of the radio interface such as frequencies used to match local preferences and regulations.

For example a user of a dual mode phone enters a rural area where WiFi coverage is unlikely. The phone's location is determined and communicated to the central authority which disables the WiFi interface. When the device moves to a more urban environment, the WiFi interface is enabled again. This prevents the device from polling constantly for WiFi where it is not likely to be available.

FIG. 1 is a block diagram illustrating an example multi-mode device 100. Multi-mode device 100 comprises a first wireless interface 102 and a second wireless interface 104. First wireless interface 102 suitably comprises a wireless transceiver configured to send and receive signals using a first protocol. Second wireless interface 104 suitably comprises a wireless transceiver configured to send and receive signals using a second protocol. For example, first wireless interface 102 can be a cellular communication interface, and second wireless interface 104 may suitably be an Institute of Electrical and Electronic Engineers (IEEE) 802.11 compatible interface, such as a WiFi. The example illustrated in FIG. 1 has two wireless interfaces; however, this should not be construed to limiting the principles described herein to multi-mode devices with two interfaces as two interfaces are used merely for ease of illustration and those skilled in the art should readily appreciate that multi-mode device 100 may suitably comprise any physically realizable number of wireless interfaces.

Multi-mode device 100 further comprises control logic 106. "Logic," as used herein, includes but is not limited to hardware, firmware, software, and/or combinations of each to perform a function(s) or an action(s) and/or to cause a function or action from another component. For example, based on a desired application or need, logic may include a software controlled microprocessor, discrete logic such as an application specific integrated circuit (ASIC), a programmable/programmed logic device, memory device containing instructions or the like, or combinational logic embodied in hardware. Logic may also be fully embodied as software. Control logic 106 is in communication with first wireless interface 102 and second wireless interface 104. Control logic 106 is configured to control the operation of first wireless interface 102 and second wireless interface 104. For example, control logic 106 may switch off the power to either first interface 102 and/or second wireless device 104 based on pre-defined criteria. For example, if first wireless interface 102 uses more power than second wireless interface 104, control logic 106 may be configured to use second wireless interface 104 when available and, in some embodiments, switch off the power to first wireless interface 102 while communicating using second wireless interface 104.

In an example embodiment, control logic 106 is responsive to signals received either on first wireless interface 102 and/or second wireless interface 104 to activate or deactivate one of first wireless interface 102 and/or second wireless interface 104. For example, control logic 106 may receive a signal on first wireless interface 102 to activate second wireless interface 104. As another example, control logic 106 may receive a signal on first wireless interface 102 to deactivate second wireless interface 104. Optionally, control logic 106 may close any activate network connections associated with second wireless interface 104 before deactivating second wireless interface 104. Similarly, control logic 106 may receive a signal on second wireless interface 104 to activate or deactivate first wireless interface 102. Deactivating a wireless interface may suitably be one of turning off power to the wireless interface or switching the wireless interface into a lower power (e.g. sleep mode or power save) state.

In an example embodiment, multi-mode device 100 comprises a user interface 108. User interface 108 is coupled to control logic 106. User interface 108 can be employed to receive data to override a particular setting. User interface 108 may suitably comprise a button, keypad, touch screen, or other device capable of receiving data from an associated user. For example, even though control logic 106 has received data and/or instructions to shut off second wireless interface 104, user interface 108 can receive data and/or instructions to power on second wireless interface 104.

In an example embodiment, control logic 106 is configured to determine the current location (coordinates) of apparatus 100. For example, control logic 106 may receive GPS signals on one of first wireless interface 102 and/or second wireless interface 104.

Figure 2:
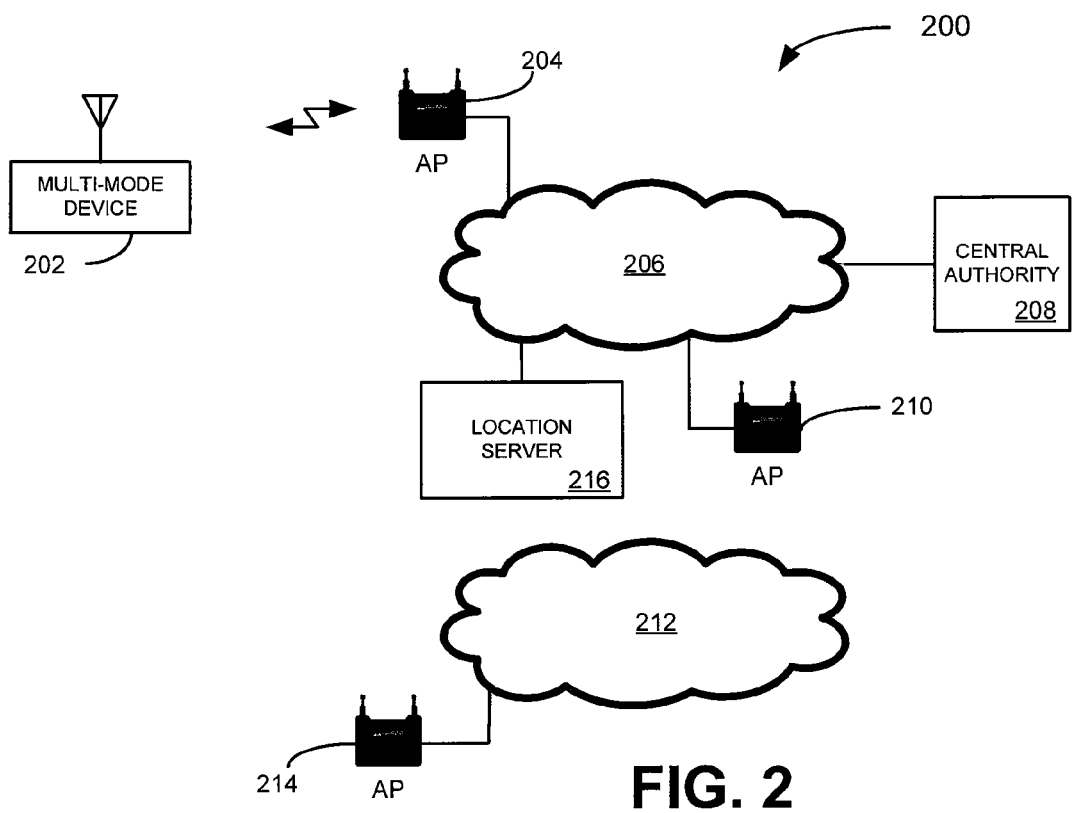
FIG. 2 is a block diagram illustrating a network employing a central authority device for controlling the operation of a multi-mode device.

FIG. 2 is a block diagram illustrating a network 200 employing a device 208 (referred to herein as a "Central Authority") for controlling the operation of a multi-mode device 202. Multi-mode device 202 can be configured to operate like multi-mode device 100 described in FIG. 1 supra. A first access point (AP) 204 is coupled to network 206. AP 204 is configured to use a first wireless protocol for communicating with wireless devices, such as multi-mode device 202. Central Authority 208 is coupled to network 206 and provides data and/or instructions to multi-mode device 202, enabling multi-mode device 202 to determine which interfaces are available to multi-mode device 202 at its current location. AP 210 is coupled to network 206 and is configured to use a second wireless protocol. In the illustrated example, AP 210 is coupled to the same network as AP 204; in particular embodiments, APs 204, 210 may be on different networks coupled to a common network, such as the internet, or different subnets on the same network. AP 214 is coupled to network 212, which is isolated from network 206, although in some embodiments networks 206, 212 may be coupled by a router, bridge, or other suitable devices.

In operation, multi-mode device 202 suitably comprises a plurality of wireless interfaces corresponding to a plurality of different network infrastructures and/or protocols. For example, multi-mode device 202 may comprise three wireless interfaces, the first suitable for communicating with AP 204, the second suitable for communicating with AP 210, and the third suitable for communicating with AP 214. Central Authority 208 receives signals from APs 204, 210 on network 206 indicating the current location of multi-mode device 202.

In an example embodiment, multi-mode device 202 determines its own location and provides location data to the currently associated AP, such as AP 204. For example, multi-mode device 202 can be configured with GPS logic.

In another example embodiment, Central Authority 208 comprises logic for determining the location of multi-mode device 202. For example, Central Authority 208 may receive Angle of Arrival (AOA), Received Signal Strength Indication (RSSI), triangulation or other data from one or more of APs 204, 210 and other APs (not shown, and possibly AP 214 if networks 206, 212 are in communication with each other) that enable Central Authority 208 to determine the coordinates corresponding to the current location of multi-mode device 202.

In another example embodiment, Central Authority 208 is in communication with a location server. Central Authority 208 may communicate with the location server periodically or on demand. For example, location server 216 can determine multi-mode device 202's current location. When Central Authority 208 wants to know multi-mode device 202's current location, an inquiry is sent to location server 216. Central authority 208 determines the probability of availability for multi-mode device 202 based on location data received from location server 216.

In an example embodiment, Central Authority 208 may continuously determine multi-mode device 202's current location. As used herein, continuously doesn't necessarily mean that the location is constantly computed but may mean that the current location is computed at predetermined intervals, such as once per second or once per five hundred milliseconds. In some embodiments, the interval for computing the current location may be variable. In an example embodiment, Central Authority 208 determines the velocity of multi-mode device 202 is computed as well as the coordinates of the current location, which can be a factor for the interval for determining the current location of multi-mode device 202. For example, if multi-mode device 202 is not moving, the interval may be set to a greater interval (for example five seconds) than the interval for when the device is moving (for example one second).

Central Authority 208 determines from multi-mode device 202's current location which wireless interfaces can be used at the current location. Central authority 208 may calculate the probability for the wireless interfaces based on configured information such as population density, geo-political information, and/or known hot spot locations (or locations where a particular interface is available). Central Authority 208 can be configured to determine available wireless interfaces for networks coupled to the same network, such as network 206, as central authority 206, and to other networks that may or may not be coupled to the same network, such as network 212, as Central Authority 208. For example, based on the current location, Central Authority 208 can determine whether multi-mode device can operate on a cellular network, an 802.11 (including WiFi) network, an 802.16 (including WiMAX) network, and/or a Bluetooth compatible network. Multi-mode device 202 would then power on the appropriate wireless interfaces and associate with the appropriate AP; for example, one of APs 204, 210, 214. Moreover, Central Authority 208 can select which wireless interface multi-mode device 208 should be used, even if more than one interface is available.

Central Authority 208 sends data to multi-mode device 202 for controlling the operation of multi-mode device 202. For example, Central Authority 208 may send data indicating which network interfaces are available and/or unavailable. In an example embodiment, Central Authority 208 the data includes commands that instruct multi-mode device 202 which interface (or interfaces) to use. In an alternative embodiment, Central Authority 208 also sends control information to mobile device 202 that includes additional communication parameters such as which operating frequency to use to match local preferences and regulations.

In the embodiment illustrating in FIG. 2, Central Authority 208 is available via the first interface serviced by AP 204 and the second interface serviced by AP 210; however, Central Authority 208 is not available to the third interface serviced by AP 214. This illustrates an example where Central Authority 208 can enable/disable an interface on multi-mode device 202 even though Central Authority 208 is not coupled to the interface.

There are several possibilities for how multi-mode device 202 may operate while coupled to third interface (e.g. the interface serviced by AP 210) if networks 206 and 212 are not linked. For example, multi-mode device may leave one of first or second wireless interfaces on in receive mode while sending and receiving data via AP 214. If Central Authority 208 determines that multi-mode device 202 is moving away an area serviced by AP 214, Central Authority 208 can signal multi-mode device 202 via the first or second wireless interface to change to another interface and/or deactivate the third interface. In another example embodiment, multi-mode device 202 may deactivate the first and second wireless interfaces while in communication with AP 214, and activate one of first and second wireless interfaces responsive to losing communication with AP 214.

Figure 3:
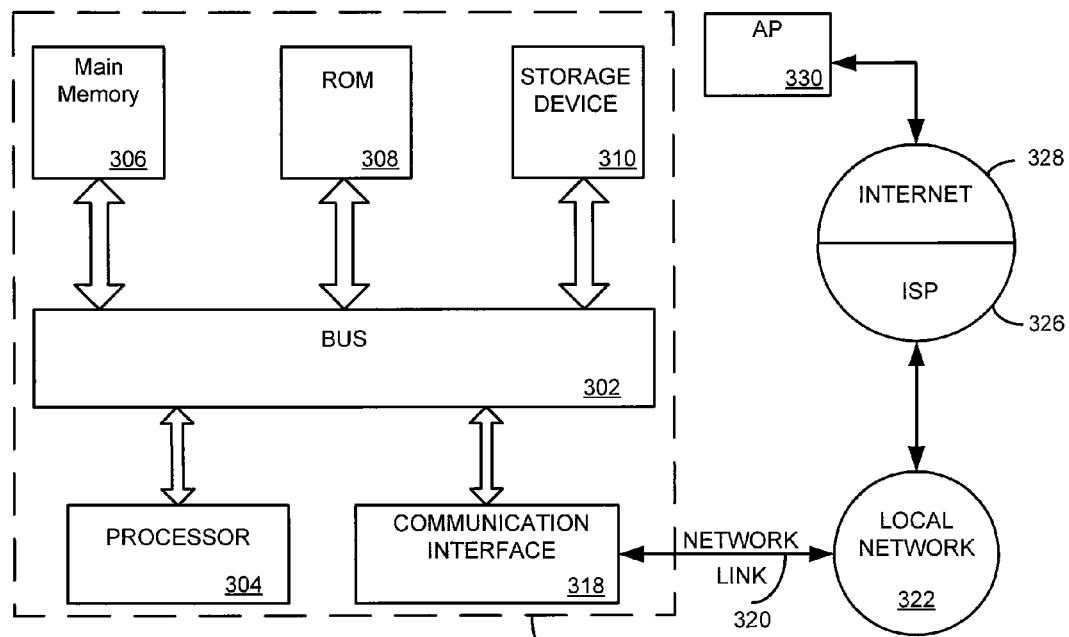
FIG. 3 is a block diagram of a computer system for implementing an example embodiment.

FIG. 3 is a block diagram that illustrates a computer system 300 upon which an example embodiment may be implemented. Computer system 300 is suitable for implementing control logic 106 of multi-mode device 100 (FIG. 1), control logic for controlling the operation of multi-mode device 202 (FIG. 2), and/or for implementing the logic for Central Authority 208 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for controlling multi-mode devices. According to an example embodiment, controlling multi-mode devices is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include, for example, optical or magnetic disks such as storage device 310. Volatile media include dynamic memory such as main memory 306. Transmission media include coaxial cables, copper wire, and fiber optics, including the wires that comprise bus 302. Transmission media can also take the form of acoustic or light waves such as those generated during radio frequency (RF) and infrared (IR) data communications. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling computer system 300 to a network link 320 that is connected to a local network 322. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information. For example, for implementing a multi-mode device such as multi-mode device 100 (FIG. 1), communication interface 318 is a wireless interface and suitably comprises a plurality of wireless interfaces. For implementing a Central Authority 208 (FIG. 2), communication interface would be the appropriate device for communicating with the network infrastructure.

Network link 320 typically provides data communication through one or more networks to other data devices. For example, network link 320 may provide a connection through local network 322 to data equipment operated by an Internet Service Provider (ISP) 326. ISP 326 in turn provides data communications through the worldwide packet data communication network, now commonly referred to as the "Internet" 328.

Computer system 300 can send messages and receive data, including program codes, through the network(s), network link 320, and communication interface 318. In the Internet example, a server 330 might transmit a requested code for an application program through Internet 328, ISP 326, local network 322, and communication interface 318. In accordance with an example embodiment, one such downloaded application provides for controlling multi-mode devices as described herein.

Figures 4, 5:
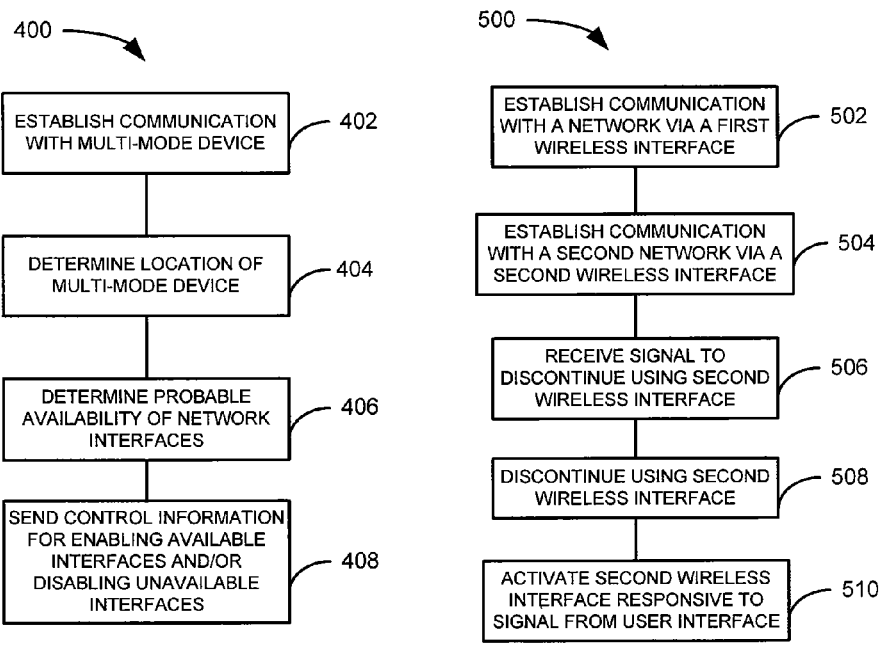
FIG. 4 is a block diagram illustrating a methodology for controlling wireless interfaces of a multi-mode device by an infrastructure device.
FIG. 5 is a block diagram illustrating a method of operation for a multi-mode device to selectively enable and disable wireless interfaces.

In view of the foregoing structural and functional features described above, methodologies in accordance with example embodiments will be better appreciated with reference to FIGS. 4 and 5. While for purposes of simplicity of explanation the methodologies of FIGS. 4 and 5 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

FIG. 4 is a block diagram illustrating a methodology 400 for controlling wireless interfaces of a multi-mode device by an infrastructure device such as a Central Authority described herein supra. Methodology 400 can be used for informing multi-mode device which interfaces it can currently use for communication, based on its current location enabling the multi-mode device to activate and/or deactivate one or more wireless interfaces. In an example embodiment, methodology 400 is implemented by a dedicated device (such as a Central Authority) on a network. In another example embodiment, methodology 400 is implemented by a plurality of devices, such as APs, switches, wireless domain controllers (WDCs), or other suitable devices on a network.

At 402, communications are established with the multi-mode device. The communication may be established on any interface. In an example embodiment, communications may be moved from one interface to another when appropriate. For example, communications may be established with a cellular interface of a multi-mode device. If communications becomes available on another interface, such as a WiFi or Bluetooth interface, then communications can be moved to that interface.

At 404, the current location or coordinates of the current location of the multi-mode device are determined. The current location may be acquired via any suitable means. For example, the multi-mode device may use GPS to determine its location, or infrastructure nodes on the network may employ RSSI, AOA, triangulation, or any other technique for calculating the current location. The location may be continuously computed, where continuously computed, as described herein supra, may mean the location is determined at predetermined intervals.

At 406, the probable availability for each interface is computed. For example, if the multi-mode device comprises a cellular interface it is likely that the interface will always be available, whereas WiFi and/or Bluetooth interfaces may not be available in many locations. In determining the probable availability, factors such as population density, geo-political data, and/or known hot spot locations can be considered.

At 408, data is sent to the multi-mode device indicating which wireless interfaces are available and/or which wireless interfaces are unavailable. The data may further comprise commands for instructing the multi-mode device to activate and/or deactivate one or more interfaces.

One or more of steps 402, 404, 406, 408 may be repeated frequently. For example, step 402 may be repeated when a currently active (first) interface is being deactivated and communication is being moved to a second interface, such as when switching from a cellular network to an 802.11 compatible network. Steps 404, 406 may be continuously repeated (e.g. repeated at predefined intervals). Step 408 may be repeated along with steps 404 and/or 406, or may be implemented when changes to the configuration of the multi-mode device are being implemented.

FIG. 5 is a block diagram illustrating a method of operation 500 for a multi-mode device to selectively enable and disable wireless interfaces. Methodology 500 may be implemented by multi-mode device 100 (FIG. 1) or multi-mode device 202 (FIG. 2) described herein supra.

At 502, the multi-mode device establishes communication with a network via a first wireless interface. In an example embodiment the first network is a default network. In another embodiment, the multi-mode device attempts to connect to one or more networks using its first, second, and any other available interface until successful. In yet another embodiment, multi-mode device 202 searches for available networks and selects a network based on a predetermined criteria such as highest throughput, lowest power connection, best signal quality, lowest link cost, etc. At 504, the multi-mode device establishes communication with a second network via a second wireless interface. In an example embodiment, communication is automatically established by the multi-mode device when the second network is detected, for example when the second wireless interface detects a Bluetooth or WiMAX connection. In another example embodiment, communication with the second network is initiated based on data received on the first interface indicating that communication on the second network may be possible.

At 506, the multi-mode device receives a signal to discontinue using the second interface. This signal may be received on either the first and/or second interface. For example, a device on the network may signal the multi-mode device to discontinue using the second network responsive to determining the multi-mode device is moving away from the second network or because a signal parameter such as throughput, RSSI, etc. indicates the signal quality is deteriorating beyond an acceptable threshold.

At 508, the multi-mode device discontinues using the second wireless interface responsive to the signal to discontinue using the second wireless interface. Optionally, power to the second wireless interface may be switched off, or the second wireless interface may be changed to a power save state.

At 510, the second wireless interface is activated responsive to a signal received on a user interface. This enables a user of the device to override the automatic detection settings for the multi-mode device. For example, multi-mode device may be equipped with a user interface, such as a switch, button, touch screen which may suitably comprise a display, allowing a user to activate the second interface. For example, if the second wireless interface is an 802.11 compatible interface, the user may activate the second is in a remote area where an 802.11 connection is not likely, if the user enters an area that is a possible 802.11/WiFi hot spot such as a gas station, restaurant, etc.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
   a communication interface configured to receive location data for a wireless multi-mode device having a first wireless interface and a second wireless interface; and
   logic in communication with the communication interface and configured to send and receive data via the communication interface;
   wherein the logic is configured to continuously receive data representative of a location of the wireless multi-mode device via the communication interface, the data representative of the location comprises data representative of a population density of the location;
   wherein the logic is configured to determine whether the wireless multi-mode device is able to connect to a network using the second wireless interface based on a probability determined from the data representative the population density of the location; and
   wherein the logic is configured to send a signal via the communication interface to the wireless multi-mode device to switch the second wireless interface to a power save state responsive to determining the second wireless interface will be unable to connect to a network.

2. The apparatus according to claim 1, wherein the location data for the wireless multi-mode device includes current coordinates for the wireless multi-mode device.

3. The apparatus according to claim 1, wherein the logic computes coordinates for current location of the wireless multi-mode devices based on the location data received for the wireless multi-mode device.

4. The apparatus according to claim 3, wherein the location data comprises angle of arrival data received from at least one access point in communication with the communication interface.

5. The apparatus according to claim 3, wherein the location data comprises received signal strength indication data received from at least one access point in communication with the communication interface.

6. The apparatus according to claim 3, wherein the location data comprises triangulation data received from at least one access point in communication with the communication interface.

7. The apparatus according to claim 1, wherein the logic is configured to determine whether the wireless multi-mode device is able to connect to a network using the second wireless interface based on geo-political data for the location.

8. The apparatus according to claim 1, wherein the logic is configured to determine whether the wireless multi-mode device is able to connect to a network using the second wireless interface based on known locations that support the wireless second interface.

9. The apparatus according to claim 1, wherein the signal to the wireless multi-mode device to enable the second wireless interface further comprises data representative of an operating frequency for the second wireless interface.

10. The apparatus according to claim 1, wherein a location of wireless multi-mode device is determined at a varying time interval based on a velocity of the wireless multi-mode device.

11. A method, comprising:
establishing communication with a wireless multi-mode device having a first wireless interface and a second wireless interface via the first wireless interface;
continuously determining a location of the wireless multi-mode device;
determining geo-political data for the location of the wireless multi-mode device;
determining a probability of whether the second wireless interface will be able to connect to a network based on the geo-political data for the location of the multi-mode device; and
sending control information to the wireless multi-mode device via the first wireless interface to inform the wireless multi-mode device to switch the second wireless interface to a power save mode responsive to determining the second wireless interface will be unable to connect to a network.

12. The method according to claim 11, further comprising:
determining a probability of whether the second wireless interface will be able to connect to a network based on a second location of the wireless multi-mode device; and
sending control information to the wireless multi-mode device via the first wireless interface to inform the wireless multi-mode device to discontinue using the second wireless interface for communication responsive to determining the second interface will be unable to connect to a network.

13. The method according to claim 11, further comprising:
determining a probability of whether the second wireless interface will be able to connect to a network based on a second location of the wireless multi-mode device; and
sending control information to the multi-mode device via the second wireless interface to instruct the wireless multi-mode device to switch the second wireless interface to a power save state for communication responsive to determining the second interface is moving into an area where the second wireless interface will be unable to connect to a network.

14. The method according to claim 11, wherein determining a current location for the wireless multi-mode device based on signal data received from at least one network node communicating with the wireless multi-mode device.

15. The method according to claim 11, wherein determining a current location for the wireless multi-mode device based on coordinates received from the wireless multi-mode device.

* * * * *